United States Patent [19]
Kai et al.

[11] Patent Number: 5,752,091
[45] Date of Patent: May 12, 1998

[54] CAMERA HAVING AN IMAGE BLUR SUPPRESSION DEVICE

[75] Inventors: Tadao Kai, Kawasaki; Akira Katayama, Koganei, both of Japan

[73] Assignee: Nikon Corporation, Tokyo, Japan

[21] Appl. No.: 813,942

[22] Filed: Mar. 3, 1997

Related U.S. Application Data

[62] Division of Ser. No. 479,398, Jun. 7, 1995, Pat. No. 5,640,611, which is a division of Ser. No. 305,759, Sep. 14, 1994, abandoned, which is a continuation of Ser. No. 83,252, Jun. 29, 1993, abandoned.

[30] Foreign Application Priority Data

Jul. 28, 1992 [JP] Japan .................. 4-200060
Nov. 17, 1992 [JP] Japan .................. 4-330975

[51] Int. Cl.⁶ ............................................. G03B 5/00
[52] U.S. Cl. .................................................. 396/52
[58] Field of Search ........................... 396/52, 53, 54, 396/55; 348/208; 359/554–557

[56] References Cited

U.S. PATENT DOCUMENTS

| | | | |
|---|---|---|---|
| 4,780,739 | 10/1988 | Kawakami et al. | 396/55 |
| 5,231,445 | 7/1993 | Onuki et al. | 396/55 |
| 5,245,378 | 9/1993 | Washisu | 396/53 |
| 5,416,554 | 5/1995 | Hamada et al. | 396/55 |
| 5,655,158 | 8/1997 | Kai | 396/55 |

FOREIGN PATENT DOCUMENTS

2-58037  2/1990  Japan .
2-126251  5/1990  Japan .

Primary Examiner—W. B. Perkey

[57] ABSTRACT

An image-shake correcting camera comprises an image shake correcting device for correcting image shakes caused by camera shakes and a photographic mode setting device for setting an operation condition of camera in photography, in which the image shake correcting device changes a correction property, based on the operation condition set by the photographic mode setting device.

2 Claims, 11 Drawing Sheets

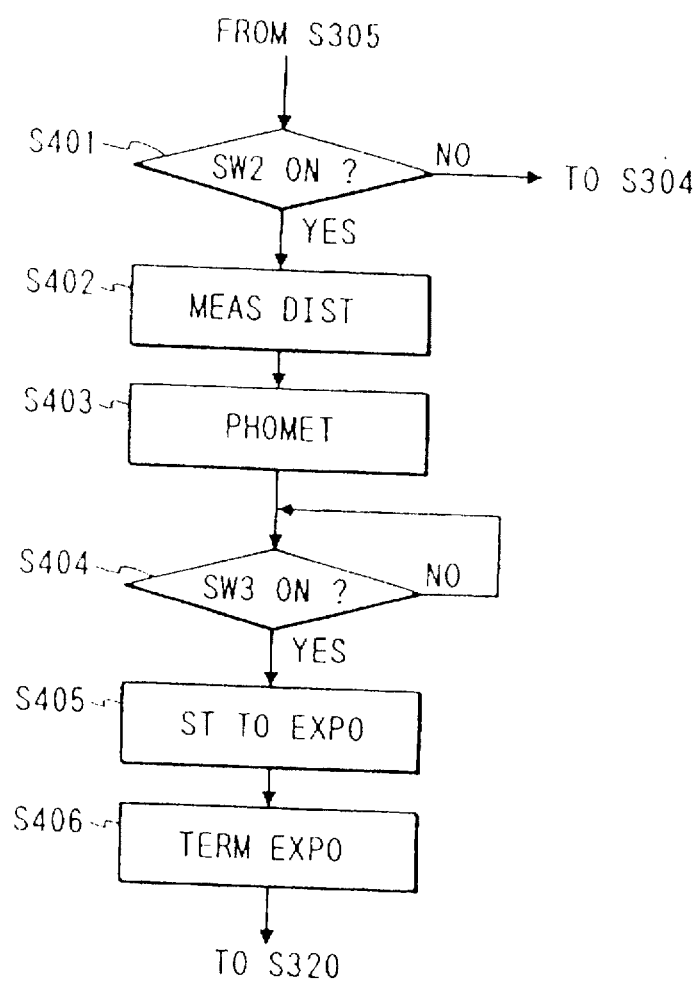

CAMERA HAVING AN IMAGE BLUR SUPPRESSION DEVICE

This application is a division of application Ser. No. 08/479,398, filed Jun. 7, 1995, now allowed, now U.S. Pat. No. 5,640,611, which was a division of application Ser. No. 08/305,759, filed Sep. 14, 1994, now abandoned, which was a continuation of application Ser. No. 08/083,252, filed Jun. 29, 1993, now abandoned.

BACKGROUND OF THE INVENTION

1. Field of the Invention

The present invention relates to a drive of an image blur suppression device (also known as image shake correcting means) in a camera which can suppress blurring in an image projected on an image plane (also referred to as correcting image shakes caused by camera shakes).

2. Related Background Art

The majority of recent cameras have the program AE mode for properly determining the aperture priority AE mode, the shutter priority AE mode, or both by a circuit inside the camera in addition to the manual mode in which a photographer determines the lens aperture and the shutter speed.

There are cameras of a type in which a strobe light source is built in a camera and the strobe photographic mode is automatically set according to luminance of a subject, and of a type in which in strobe photography a photographer can select either a leading curtain synchro mode in which the strobe is flashed in synchronism with the opening of a shutter leading curtain or a trailing curtain synchro mode in which the strobe is flashed immediately before the closure of a shutter trailing curtain.

Among such various exposure methods, a photographic mode is properly selected in accordance with the photographic purpose of photographer, which in turn makes it possible that the photographic purpose of a photographer can be judged by a camera upon selection of a photographic mode.

There is such a technology already disclosed that a camera having some selectable photographic modes as described above is provided with image shake correcting means for correcting image shakes caused by camera shakes and that the drive pattern of image shake correcting means is changed according to the mode selection out of the photographic modes.

For example, Japanese Laid-open Patent Application No. 2-58037 shows an example in which the drive of image shake correcting means is not carried out if the strobe photographic mode is selected.

In considering problems of image shake correcting means during photography, it is necessary to consider a case in which a photographer is about to conduct panning.

Namely, when a photographer moves the camera to conduct panning, the camera with image shake correcting means normally judges that the camera movement is undesirable camera shake. There is thus a great risk of losing the dynamic effect of panning, because the correction drive for suppressing image shakes is effected on the rotation of camera in panning as well. A countermeasure to such a case is also described in above Japanese Laid-open Patent Application No. 2-58037, which shows an example to stop the drive of image shake correcting means.

Either of the above conventional examples describes the countermeasure of conducting no drive of image shake correcting means.

A present trend in exposure methods in strobe photography is to effect strobe flashing in slow shutter (as will be referred to as slow synchro) in which an atmosphere upon photography can be more faithfully depicted while efficiently using the representation of background behind a main subject. Therefore, if the drive of image shake correcting means is always stopped during strobe flashing, the representation of background is not only degraded by camera shakes, but the main subject also forms a blurred image because of stationary light, thus degrading a photographic result.

The unconditional drive stop is more problematic, especially in the trailing curtain synchro mode which is often used to emphasize movement, because the photographic condition of low shutter speed is frequent. Also, in case of the latter panning photography, the image shake correction drive would better be effected on image shakes caused by fine camera shakes other than the smooth camera rotation in the direction of panning to prevent the image of the subject from being unnecessarily degraded. There is, therefore, a problem in this respect in the arrangement that the image shake correction drive is always stopped during panning photography as in the conventional technology.

Now described as a conventional example of a circuit having a time constant is one used in an image-shake preventing camera with a camera shake correcting circuit.

A camera having a conventional camera-shake correcting circuit, as disclosed in Japanese Laid-open Patent Application No. 2-126251, obtains a camera shake angular velocity signal from an angular velocity detecting sensor, and calculates a displacement amount of camera shake through a filter circuit, a drift compensation circuit, and an integration circuit. In the method as described in this publication, no specific countermeasure is described as to the waiting time after switching-on and before a stable state of a circuit, which is normally problematic in filter circuits. The publication shows such a measure only for the integration constant of an integration circuit, which is another important element, that "when the shutter speed is high (that is, when the subject is bright) the integration constant is decreased to allow an instant response to the release whereas when the shutter speed is slow, that is, when the subject is dark, a warning is given to a photographer to delay the release and the integration constant is increased to allow detection of slow camera shakes."

To obtain a camera shake displacement amount as described above, a signal from the angular velocity detecting sensor is subjected to filtering and the filtered signal is integrated. The circuits having the time constant, such as the filter circuit and the integration circuit used in the above arrangement, include a lot of problems to be considered, as listed below. It cannot be said that the conventional technology as described above fully discloses solutions to these problems.

(1) To obtain a camera shake displacement amount, a filter circuit is necessary for removing drift components and noise components in a signal from the angular velocity detecting sensor in addition to the integration circuit for integrating the signal from the angular velocity detecting sensor. Since a frequency band of camera shake signal obtained from the angular velocity detecting sensor is about 1 to 10 Hz, the cut-off frequency of the filter circuit will be a low frequency of not more than 1 Hz. Such a filter circuit requires a substantial time (several tens of seconds) before the circuit is stabilized after switched on.

(2) The above is also the case as to the integration circuit. Thus, if a subject is dark, a considerably long time is necessary for determining the integration constant.

(3) As described, a considerable time is necessary before the camera shake correcting circuit becomes ready to start a stable operation. A specific measure to solve this problem is necessary. Also, some means is necessary for giving a warning to a photographer before the circuit is stabilized. The above conventional examples disclose no specific warning means.

(4) As for the warning means, a further consideration should be taken. For example, if the warning means is temporary warning means using a warning sound or the like, a photographer could fail to hear the warning sound. There would be a situation that he cannot judge whether he may start shooting even after the filter circuit is stabilized and the integration constant of integration circuit is set. Accordingly, a measure to avoid such a situation is also necessary.

SUMMARY OF THE INVENTION

It is an object of the present invention to provide a camera which can correct image shakes caused by camera shakes, in which the drive of image shake correcting means is not suspended under the circumstances as described above but a drive of said means suitable for each photographic circumstance is carried out, whereby a photograph may be obtained with unnecessary image shakes being suppressed.

It is another object of the present invention to provide a condition output apparatus which can effectively judge a stable condition of a circuit having a time constant and indicate the judgement result, and specifically to provide a condition output apparatus which can effectively judge a stable condition of a circuit having a time constant in a camera shake correcting circuit used in an image-shake preventing camera and which thereby enables a photographer to clearly recognize it.

The present invention involves a camera having image shake correcting means for correcting image shakes caused by camera shakes, in which a drive property of the image shake correcting means is changed depending upon the photographic mode setting in the camera.

The photographic mode setting herein means for example setting either one of various modes in an exposure control method, such as the manual photographic mode, the aperture priority AE mode, the shutter priority AE mode, and the program AE mode, setting either the strobe photographic mode using the strobe light as auxiliary light or the normal photographic mode not using it, or setting either the leading curtain synchro flashing mode or the trailing curtain synchro flashing mode in the strobe photographic mode.

As described above, one of such various photographic modes is properly selected according to the photographic purpose of a photographer, which in turn makes it possible that the photographic purpose of the photographer is judged by the camera in accordance with the selection of the photographic mode. Then, the drive of image shake correcting means suitable for the photographic circumstance is carried out taking the photographer's intention into consideration.

Specifically in the present invention, when either the manual photographic mode or the shutter speed priority AE photographic mode, which are photographic modes frequently used in panning photography, is selected, the drive property of image shake correcting means in the camera according to the present invention is changed to depend on higher frequency components in camera shakes, and thus the image shake correction is not effected on the smooth camera rotation for panning, but the image shake correction drive is carried out for image shakes caused by fine camera shakes other than the camera rotation.

In case that the strobe photographic mode, which is frequently used in photography under dark conditions, is selected, the drive property of the image shake correcting means in the camera according to the present invention is determined taking relatively low frequency components in camera shakes into consideration so that the slow synchro photography, which can faithfully depict an atmosphere during photography, may be fully dealt with.

Moreover, in case that the trailing curtain synchro mode, which is frequently used to emphasize movement, is set, the drive property of the image shake correcting means in the camera according to the present invention is determined taking further lower frequency components in camera shakes into consideration.

In the present invention, as described, an optimum drive property of the image shake correcting means is set taking the photographic purpose of a photographer into consideration in accordance with the setting of a photographic mode out of various modes in a camera, whereby an excellent image shake correction effect may be achieved in each of the various photographic modes and, as a result, an excellent photographic result may be obtained according to the photographer's intention.

A condition output apparatus of the present invention comprises a filter circuit in a control circuit section, as being a circuit having a time constant, a switch as switching means for switching on or off the circuit, a counting circuit as time counting means for counting a time after the filter circuit is switched on through the switch, a CPU as comparing means for comparing the time counted by the counting circuit with a certain time corresponding to the time constant of the filter circuit, and an indication circuit as notifying means for notifying in response to the comparison result of the CPU that the condition of the circuit is stabilized.

A condition output apparatus of the present invention is further characterized in that the indication circuit as the notifying means continuously notifies that the condition of the filter circuit or the like in the control circuit section is stabilized.

A condition output apparatus of the present invention is further characterized in that the circuit having the time constant is a filter circuit as a filter having a certain property for filtering an input signal, or an integration circuit for integrating the input signal.

A condition output apparatus of the present invention is further characterized in that the indication circuit as the notifying means notifies by a visual indication that the condition of the filter circuit or the like in the control circuit section is stabilized.

A condition output apparatus of the present invention is further characterized in that the notifying means notifies by sounds that the condition of the filter circuit or the like in the control circuit section is stabilized.

A condition output apparatus of the present invention is built in a camera, and further comprises a CPU as control means for controlling the release of the camera in response to the comparison result by the CPU.

A condition output apparatus of the present invention is characterized in that the camera further comprises a camera shake correcting circuit for correcting camera shakes and that the CPU controls the release of the camera in response to the comparison result thereof.

A condition output apparatus of the present invention is further characterized in that there are a plurality of circuits each having a time constant and that the CPU compares the time counted by the counting circuit with a certain time corresponding to a largest time constant out of the time constants of said plurality of circuits.

In the condition output apparatus of the present invention, the counting circuit counts the time after the switch is turned on, the CPU compares the count value with a time corresponding to the time constant of the filter circuit or the like, and the indication circuit indicates that the condition is stabilized when it is judged that a time enough to stabilize the condition of circuit has elapsed. Accordingly, it is surely judged that the filter circuit or the like having the time constant is stabilized.

In the condition output apparatus of the present invention, it is continuously notified that the condition of a filter circuit or the like is stabilized. Accordingly, it can be always checked that the filter circuit or the like is stabilized.

In the condition output apparatus of the present invention, it is judged that the stable condition is attained for the circuits having various time constants such as the filter circuit and the integration circuit arranged in the control circuit section, whereby all the circuits having the time constants in the control circuit section may be surely stabilized.

In the condition output apparatus of the present invention, it is notified by a visual indication that the condition of the filter circuit or the like in the control circuit section is stabilized, whereby it may be readily recognized that the circuits having the time constants in the control circuit section are stabilized.

In the condition output apparatus of the present invention, it is notified by sounds that the condition of the filter circuit or the like in the control circuit section is stabilized. Accordingly, it may be readily recognized that the circuits having the time constants in the control circuit section are stabilized.

In the condition output apparatus of the present invention, the release operation of a camera is allowed after the filter circuit or the like in the control circuit section is stabilized. Accordingly, a mis-shot by a photographer may be effectively prevented.

In the condition output apparatus of the present invention, if the release button is pressed before the condition of the filter circuit or the like in the control circuit section is stabilized, the photography is carried out without operating the camera shake correcting circuit. Accordingly, a photograph may be taken without camera shake correction.

In the condition output apparatus of the present invention, the CPU compares the time counted by the counting circuit with a time corresponding to the largest time constant out of the time constants of the filter circuit and other circuits in the control circuit section. Accordingly, all the circuits having the time constants in the control circuit section may be surely and correctly operated.

BRIEF DESCRIPTION OF THE DRAWINGS

FIG. 16 is a flowchart (second half) to show the second example of operation in the embodiment of the present invention.

DESCRIPTION OF THE PREFERRED EMBODIMENTS

Figure 1:
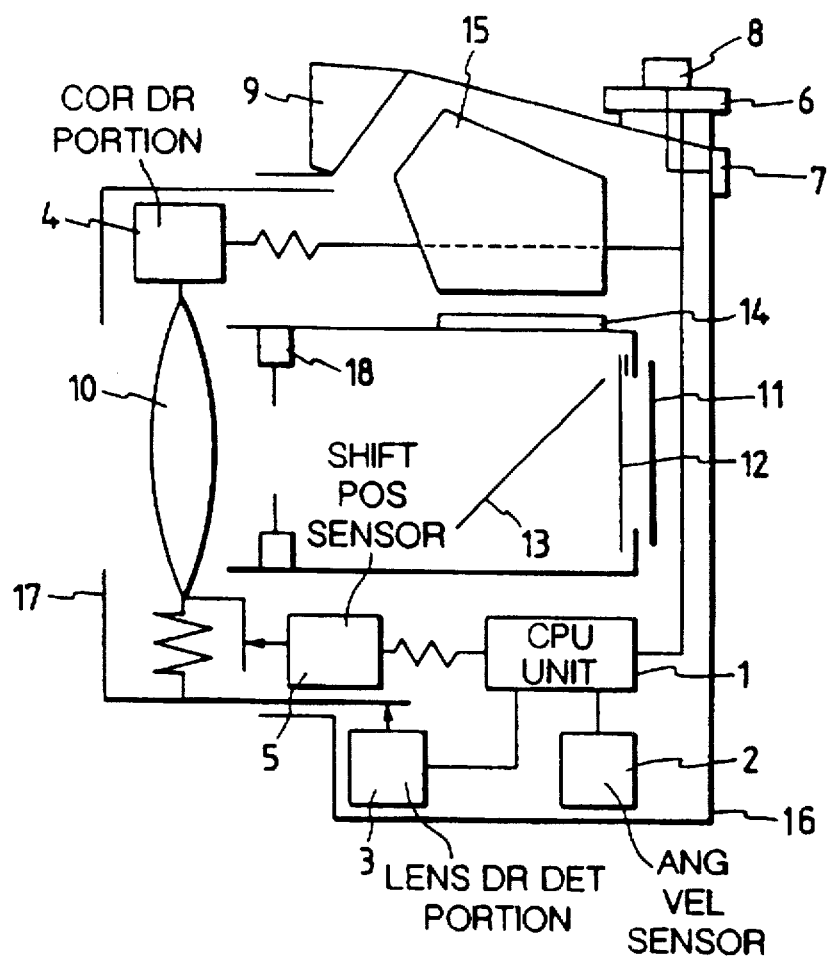
FIG. 1 is a drawing to show a camera in an embodiment of the present invention.

FIG. 1 is a drawing to show a camera 16 in an embodiment of the present invention.

Figure 2:
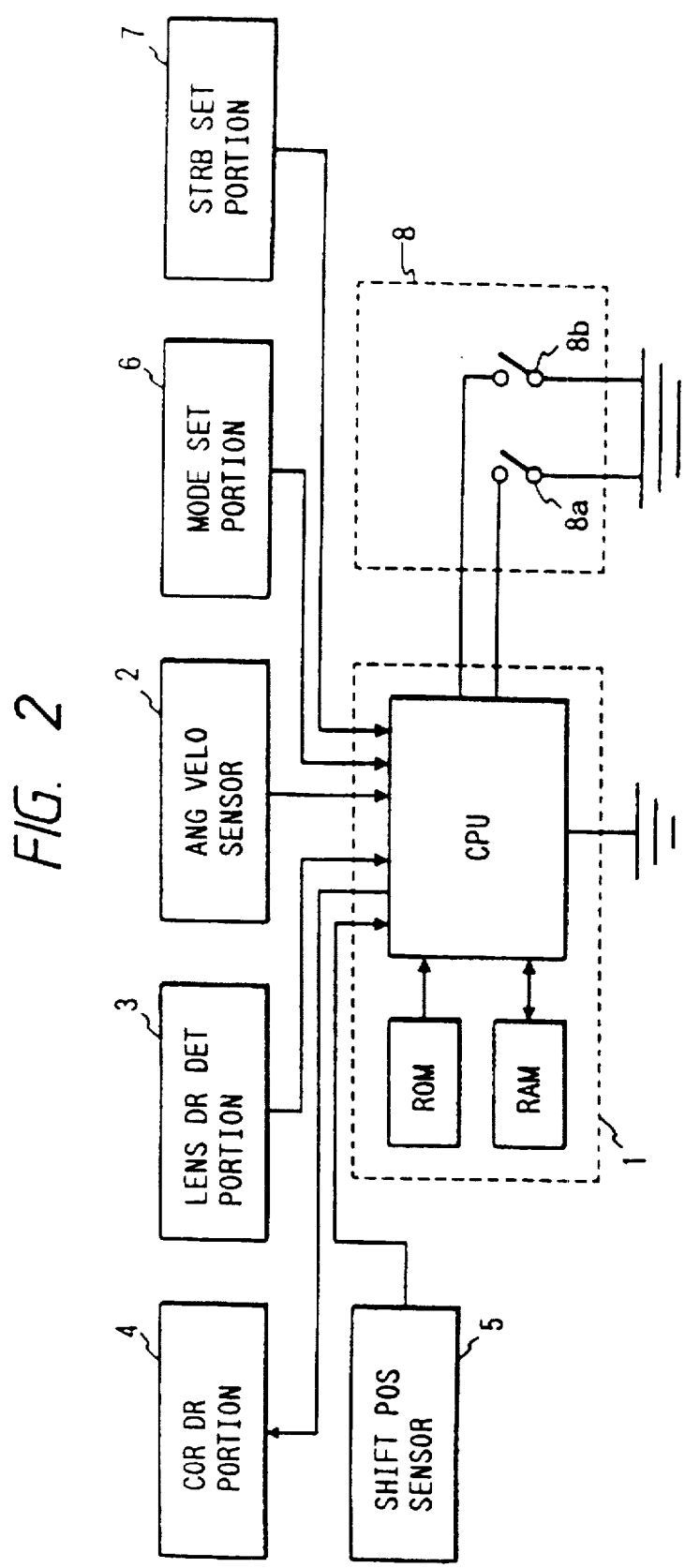
FIG. 2 is a block diagram to show the flow of signals in the camera in the embodiment of the present invention.

Also, FIG. 2 is a drawing to show the flow of signals as a block diagram with only portions relating to an image shake correction in the embodiment. In FIG. 2, reference numeral 4 denotes a correction drive portion, 3 a lens drive detection portion, 2 an angular velocity sensor, 6 a mode setting portion, 7 a strobe setting portion, 5 a shift position sensor, 1 a CPU unit, and 8 a release switch through which a release half-press is detected upon closure of switch 8a and a release full-press is detected upon closure of switch 8b.

The embodiment will be described mainly referring to FIG. 1.

In FIG. 1 reference numeral 1 designates a CPU unit for controlling operations of the portions. As also shown in FIG. 2, the CPU unit 1 comprises a CPU portion for processing various signals and executing calculations, a ROM portion for storing various coefficient values used in operation programs or in calculation in the CPU portion, and a RAM portion for temporarily storing information during the signal processing or calculation process.

Numeral 2 designates an angular velocity sensor for detecting a rocking motion of the photographic optical axis of the camera and outputting an angular velocity signal to the CPU unit 1. Numeral 3 denotes a lens drive detecting portion for detecting a drive amount of the photographic lens upon photography and outputting a drive amount signal to the CPU unit 1. The CPU unit 1 can calculate the subject distance in photography with the signal from the lens drive detecting portion 3. Numeral 10 is a photographic lens. Numeral 4 denotes a correction drive portion controlled by the CPU unit 1 to correct image shakes and to shift-drive the photographic lens 10. Numeral 5 represents a shift position sensor for detecting a shift position of the photographic lens 10 shift-driven by the correction drive portion 4 and, in response, outputting a signal to the CPU unit 1.

This example shows that the correction drive portion 4 shift-drives the entire photographic lens 10 to effect the image shake correction, but the invention is not limited to this arrangement. Another arrangement may be such that the photographic lens 10 comprises a plurality of lenses and that one or some lenses thereof are shift-driven to effect the image shake correction. In this arrangement the shift position sensor 5 outputs a shift position detection signal of the lenses shift-driven to the CPU unit 1.

Numeral 6 designates a mode setting portion for setting one of various photographic modes concerning the exposure control of camera of the present embodiment. The photographic modes herein are the manual photographic mode, the aperture priority AE mode, the shutter priority AE mode, and the program AE mode. The mode setting portion 6 outputs a signal of the a photographic mode set by a photographer to the CPU unit 1.

Numeral 7 represents a strobe setting portion for setting one of various modes concerning the strobe photography of camera of the present embodiment. The strobe modes herein are the strobe photographic mode using the strobe unit, the normal photographic mode not using it, the leading curtain synchro flashing mode and the trailing curtain synchro flashing mode in the strobe photographic mode. The strobe setting portion 7 also outputs a signal of a strobe mode set by a photographer to the CPU unit 1.

Numeral 8 denotes a release button. The release button 8 is constructed as a switch which supplies a signal to start the operation of the camera 16 with a half-press and a signal to start the exposure operation with a full-press to the CPU unit 1.

Numeral 9 represents a strobe flashing portion. Numeral 11 is film for recording photographed images, and 12 a shutter. The shutter 12 is a so-called focal-plane shutter comprising a leading curtain and a trailing curtain. Exposure is started on the film 11 when the leading curtain, which is usually in a light shielding state, is opened. The exposure of the film 11 is terminated when the trailing curtain is then brought into the light shielding state.

Further, numeral 13 designates a quick return mirror, 14 a finder screen, 15 a pentaprism, 16 a camera body, 17 a lens barrel, and 18 an aperture stop.

Figure 3:
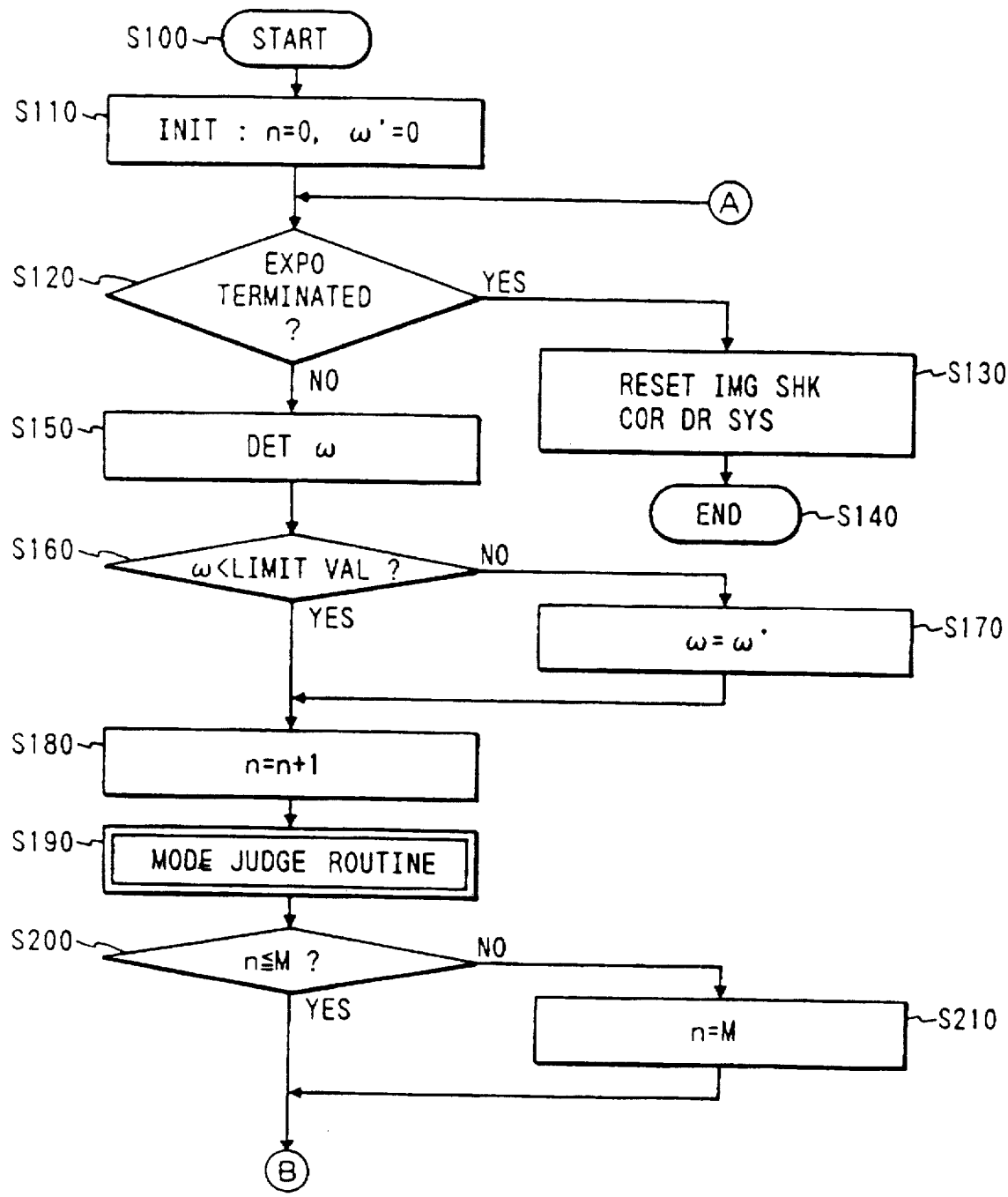
FIG. 3 is a drawing to show a part of a flow chart illustrating the operation of the embodiment of the present invention.
Figure 4:
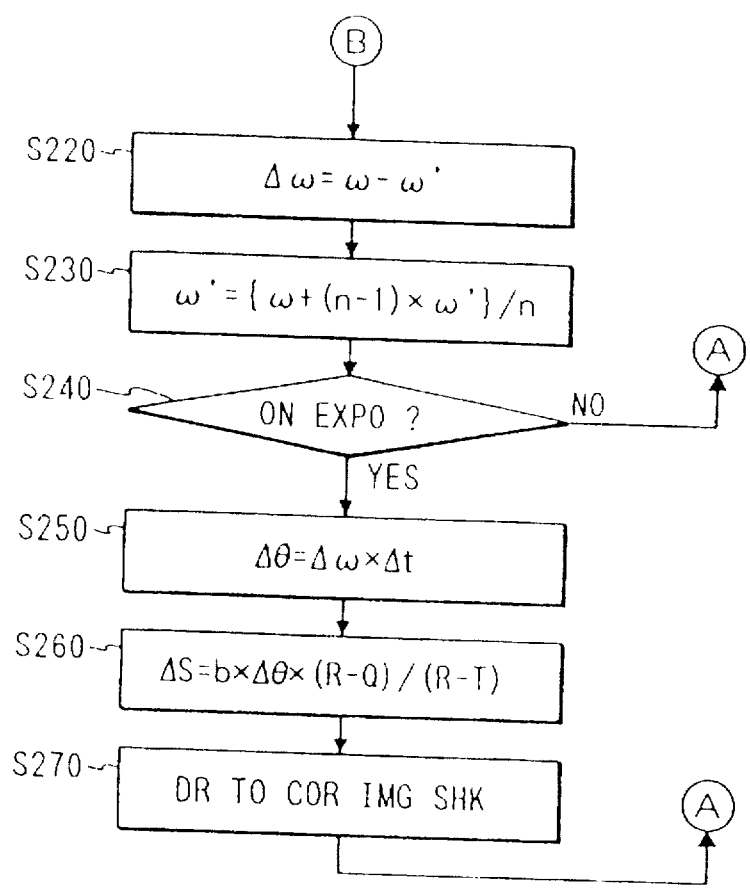
FIG. 4 is a drawing to show another part of the flow chart illustrating the operation of the embodiment of the present invention.
Figure 5:
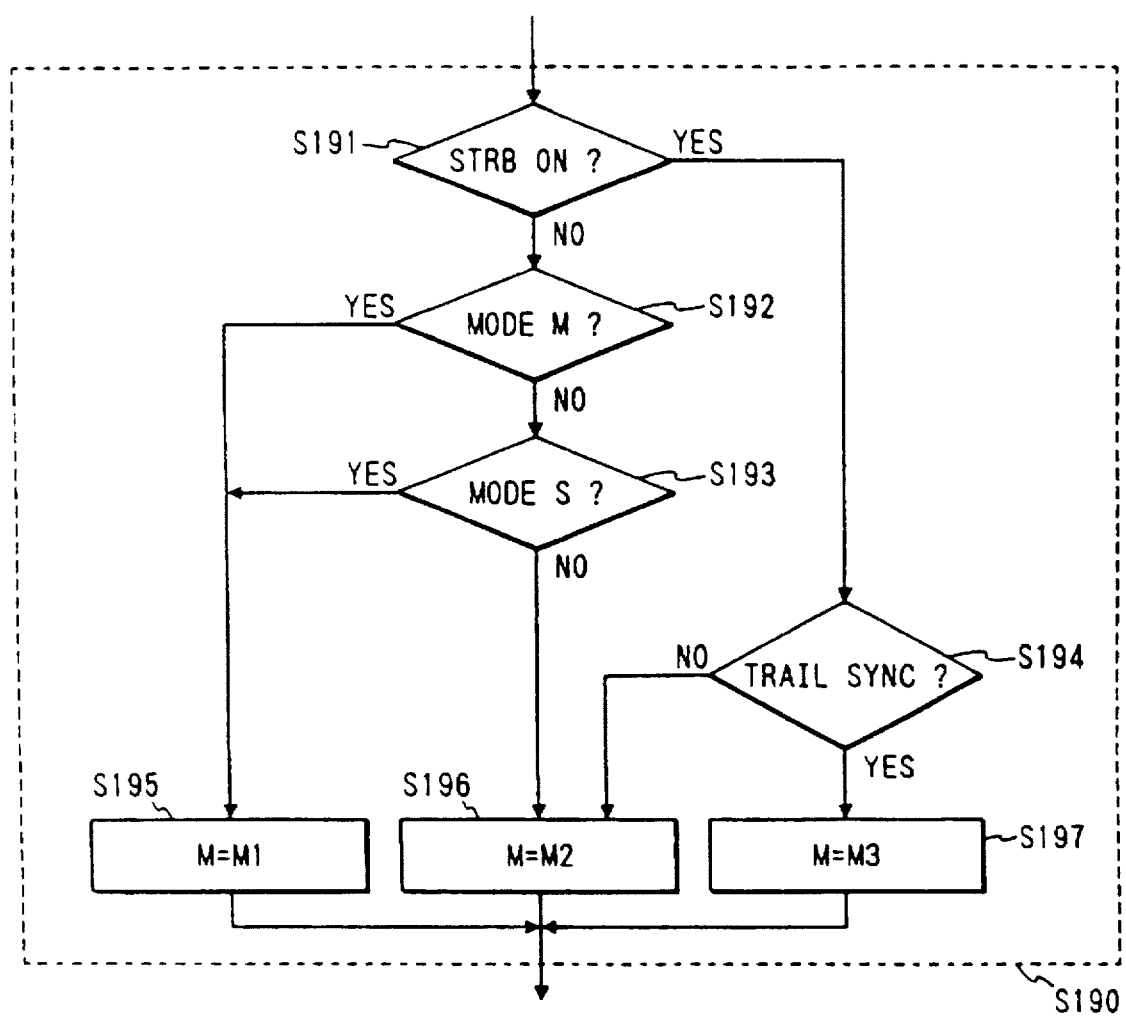
FIG. 5 is a detailed drawing to show a part of the flow chart illustrating the operation of the embodiment of the present invention.

FIG. 3, FIG. 4, and FIG. 5 are drawings to illustrate the operation of the embodiment as described with FIG. 1 and FIG. 2. Respective operation steps are processes executed in the CPU unit 1 unless noted otherwise. When the half-press operation of the release button 8 by a photographer is detected with a half-press switch signal of the release button 8, or when a photographic preparation completion step, for example, the film winding end, is reached in the state that the power of the camera is already on, an image shake correction operation routine of the present invention is started at Step (as will be abbreviated as S) 100.

Variables used in the operation routine are then initialized at S110. "n" is a variable concerning a repetition number of this routine, an initial value of which is "0". Also, "ω'" is a variable corresponding to an average value of angular velocity of camera shakes, an initial value of which is also "0".

It is then judged at S120 whether this operation routine is to be terminated. Specifically, it is judged here from the operation state of the shutter 12 whether the exposure operation is finished. If the exposure operation is finished, this operation routine proceeds to S130 to return the correction drive portion 4 to a predetermined reset position, and then goes to S140 to conclude the series of processes in this routine.

On the other hand, if it is judged at S120 that the exposure operation is not finished yet, the flow goes to S150. An output "ω" of the angular velocity sensor 2 is detected at S150. It is judged at S160 whether the value of angular velocity output "ω" detected at S150 is smaller than a predetermined limit judgement value preliminarily stored in the ROM portion. This limit value is a predetermined value for judging whether the value of "ω" is proper as a detection output of camera shakes in the normal photographic state. If the value of "ω" is above the limit value, it is judged that the detection output is not from the normal photographic state, but apparently from panning or from an abnormal state, for example, due to a change in the set position of camera. Then, if the value of angular velocity output "ω" is not smaller than the limit value at S160, the flow goes to S170 to substitute the value of "ω'" for the value of "ω". If this operation routine is executed for the first time it is set at prior S110 that "ω'=0", and therefore "0" is substituted. At each routine after the first cycle, a value of "ω'" calculated at a preceding routine (at S230 as described below) is substituted. The flow then goes from S170 to S180.

On the other hand, if the value of angular velocity output "ω" is smaller than the limit value at S160, the flow directly goes to S180. At S180 the variable "n" of repetition number of this routine is increased by one.

The flow then goes to a mode judgement routine at S190. FIG. 5 shows the details of contents at S190.

FIG. 5 is a drawing to illustrate the details of contents at S190.

At the first step of S191, it is judged by detecting the output signal of the strobe setting portion 7 whether the strobe mode of the camera in the present embodiment is set in the strobe photographic mode in which the strobe light is used or in the normal photographic mode in which the strobe light is not used. If the strobe mode is on (in the strobe photographic mode), the flow goes to S194 and the following steps. If the strobe mode is off (in the normal photographic mode), the flow goes to S192 and the following steps.

First described is the case that the strobe mode is on. It is judged at S194 by detecting the output signal of the strobe setting portion 7 in the same manner as at S191 whether the leading curtain synchro flashing mode or the trailing curtain synchro flashing mode is selected. If the trailing curtain synchro flashing mode is selected the flow goes to S197 to set a value of factor "M" concerning a time constant of a drive control property of the correction drive section 4 to a predetermined value "M3" preliminarily stored in the ROM portion.

If it is judged at S194 that the selected mode is not the trailing curtain synchro flashing mode, the flow goes to S196 to set the value of factor "M" to a predetermined value "M2" preliminarily stored in the ROM portion.

If the strobe mode is off in the judgement at S191 the flow goes from S191 to S192 and the following steps. At S192 and the following step, it is judged by detecting the output signal of the mode setting portion 6 which mode is set as the mode concerning the exposure control of the camera of the present embodiment.

It is first judged at S192 whether the mode is set in the manual photographic mode. If the manual photographic mode is selected the flow goes to S195, whereas if otherwise the flow goes to S193. It is judged at S193 whether the mode is set in the shutter priority AE mode. If the shutter priority AE mode is selected the flow goes to S195 similarly as at S192, whereas if otherwise to S196. In other words, the flow goes to S195 if the mode is set in the manual photographic mode or in the shutter priority AE mode, but to S196 if in the aperture priority AE mode or in the program AE mode. At S195 the value of factor "M" as described above is set to a predetermined value "M1" preliminarily stored in the ROM portion. S196 is as described above.

Now described are the predetermined values "M1", "M2", and "M3" substituted for the value of factor "M" concerning the time constant of the drive control property of the correction drive portion 4.

As described above, the purpose of the present invention is that if the manual photographic mode or the shutter speed priority AE photographic mode, which are the photographic modes frequently used in panning photography, is selected the image shake correction is not effected on the smooth camera rotation for panning but on image shakes caused by fine camera shakes other than that.

In addition, if the trailing curtain synchro mode, which is often used to emphasize movement, is set out of the strobe photographic modes frequently used for photography under dark conditions, the image shake correction drive is carried out taking into consideration lower frequency components in camera shakes than in the normal photographic condition. Accordingly in setting of the above three modes of the photographic mode for panning, the normal photographic mode, and the trailing curtain synchro mode, the drive control property of the correction drive portion 4 must be determined, lowering the lowest frequency of shake components to be taken into account in the order of the panning mode, the normal mode, and the trailing curtain synchro mode. In other words, the control property must be determined increasing the time constant in the named order. Thus, the numerical value substituted for the factor "M" concerning the time constant of the drive control property of the correction drive portion 4 had better be changed for each of the above three modes. The numerical values of M1, M2, and M3 substituted for the factor "M" are set to satisfy the following relation: M1<M2<M3.

After substituting the values of M1–M3 for the factor "M" at S195–S197 as described, all the steps in S190 are completed and the flow goes to S200. Returning to FIG. 3, S200 and the following steps will be described.

At S200 the value "n" of routine operation number increased at S180 is compared with the factor "M" determined at above S190. This comparison is for determining the upper limit of the value "n" used in the operation expression at S230 as will be described below. If "n" is not more than "M" at S200 the flow goes to S220 and the following steps. This process is shown by "B" in FIG. 3. On the other hand, if "n" is over "M" the flow goes to S210 to substitute "M" for the value of "n", and then to S220 and the following steps.

S220 and the following steps are shown in FIG. 4.

Calculated at S220 is an angular velocity, "Δω=ω–ω'", of camera shake components to be image-shake-corrected. "ω" in the right side is the value of angular velocity output "ω" of camera shakes detected at S150. Also, "ω'" is an average value of camera shake angular velocity calculated at S230 in the previous routine (or set at S110). An angular velocity of shake component may be obtained as a deviation of present camera shake angular velocity from the average angular velocity of camera shakes.

At next S230 a new "ω'" is calculated. The operation expression is as follows.

$$\omega' = \{\omega + (n-1) \times \omega'\}/n \quad (1)$$

The left side is the new "ω'". "ω'" in the right side is the old value. "ω" and "n" are the respective values as described above. The upper limit of "n" used in this equation is the value determined at above S190 and S200. In case that this operation routine is repeated during the half-press of the release button, the value of "n" will converge either one of the predetermined values of "M1"–"M3" substituted at S190 depending upon the photographic mode setting.

As seen from the above equation, the stability of "ω'", which is a value related to the average of camera shake angular velocity, increases as the value of "n" becomes larger. Namely, the same effect may be attained in camera shake detection as in the case that the time constant of detection system is increased. In contrast, the stability of "ω'" decreases as the value of "n" becomes smaller, showing a high responsibility to a change. In other words, the same effect may be obtained in camera shake detection as in the case that the time constant of detection system is decreased. If the full-press operation of release button 8 is detected at S240 with a full-press switch signal, or if a series of exposure operations are in progress, the photographic lens 10 is shift-driven by the correction drive portion 4 and the flow goes to S250 and the following steps for correcting image shakes.

If neither of the above conditions is met in a state before exposure operation, the camera is not in the release state, and the flow returns to S120 to repeat this operation routine. This flow is shown by "A" in FIG. 4 and in FIG. 3. If the exposure operation condition is detected, the flow goes to S250. At S250 an angle change amount "Δθ" of camera shake component is calculated using the angular velocity "Δω" of camera shake component obtained at S220. The operation expression is as follows.

$$\Delta\theta = \Delta\omega \times \Delta t \quad (2)$$

"Δt" in the right side in the above equation is a unit time necessary for a single operation of this routine, and thus "Δω×Δt" in the right side represents an angle change amount of camera shake component in a current routine operation.

Then, calculated at S260 is an image shake correction amount (shift amount of photographic lens 10) "ΔS" for correcting the image shake given with the above angle change amount of camera shake component.

$$\Delta S = b \times \Delta\theta \times (R-Q)/(R-T) \quad (3)$$

Figure 6:
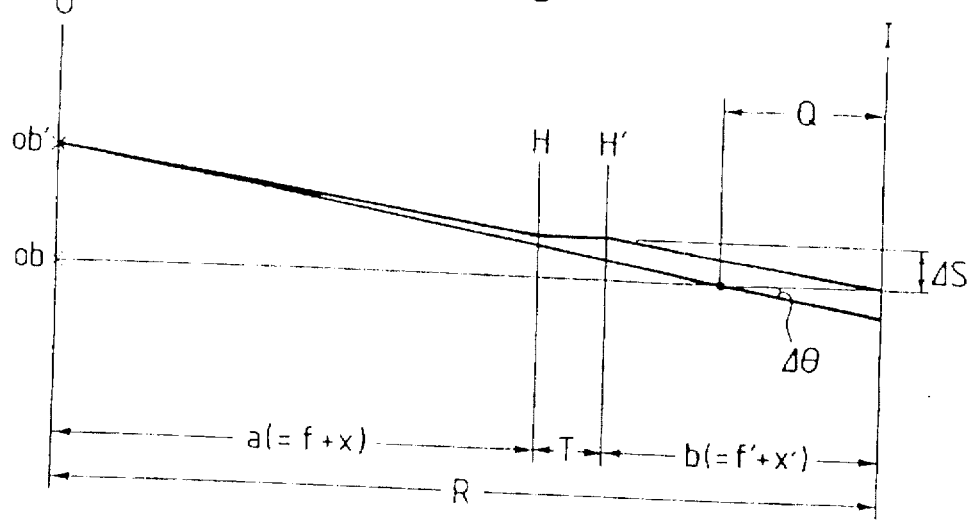
FIG. 6 is a drawing to illustrate variables in an operation expression in the above flow chart.

FIG. 6 is a drawing to illustrate corresponding portions of the variables in the right side in the above equation. "b" represents a distance between the rear principal plane (H') of a photographic lens and an imaging point. "R" a distance between a subject and the imaging point. "Q" a distance between the rotation center of camera shakes and the imaging point (which will be negative if the rotation center is behind the imaging point), and "a" a distance between the subject and the front principal plane (H) of the photographic lens. Further, "T" in FIG. 6 stands for a distance between the front principal plane (H) of the photographic lens and the rear principal plane (H') of the photographic lens, which is a value to represent the thickness of the lens and is stored in the ROM portion in the CPU unit 1.

"b" and "R" are numerical values which can be calculated in the CPU unit 1 with the output signal of the lens drive detecting portion 3 as described above with FIG. 1. In detail, if the photographic lens 10 has a fixed focus, the value of "b" can be obtained with the lens drive amount detection signal directly from a numerical value table set in the ROM portion, and the value of "R" is also uniquely determined.

Even if the photographic lens 10 is a zoom lens or an internal focusing lens with variable lens focal length (f) or the lens thickness "T", the CPU unit 1 can detect the state of the lens during photography with zoom position detecting means (encoder) or the like, and therefore the above values "b", "R" and "T" can be calculated by using an output of the detector, the output signal of the lens drive detecting portion 3, and the numerical value table set in the ROM portion.

As for the value of "Q", it is better that an optimum numerical value preliminarily obtained by experiments is stored in the ROM portion of the CPU unit 1. Alternatively, a good result may be approximately obtained by measuring the center of gravity of the entire camera and setting the distance between the center of gravity and the imaging point (film 11) to "Q".

Using the values of "b", "R", "Q", "T" and "Δθ" as described, the drive amount "ΔS" of the correction drive portion 4, by which the image shake caused by a camera shake can be corrected, can be calculated as shown in FIG. 6. For brevity of description, FIG. 6 shows a situation that a subject is moved from the position of "ob" to "ob'" by "Δθ" relative to the photographic optical axis of camera. In actual situations the subject is fixed but the camera photographic optical axis is rotated by "Δθ".

At next S270 the photographic lens 10 is shift-driven by the correction drive portion 4 with the image shake correction drive amount "ΔS" calculated at the above S260 to effect the image shake correction. The shift position of the photographic lens 10 is transmitted with the output signal from the shift position sensor 5 to the CPU unit 1, and is used for drive control of the correction drive portion 4.

After the image shake correction drive at S270 is completed, the operation routine returns to S120 to repeat the steps as described. This flow is denoted by "A".

The camera of the present invention has been described above, but the present invention is not limited to the above embodiment. For example, as described with S250 and the following steps in FIG. 4, the drive of the correction drive portion 4 may be controlled using the angular velocity "Δω" of camera shake component calculated at S220, though the image shake correction drive was controlled with the image shake correction amount (shift amount of photographic lens 10) in the present embodiment. In that arrangement, the steps S250 and S260 described with FIG. 4 should be omitted. Also, the shift position sensor 5 had better be replaced with a sensor of a shift velocity detection type for use in drive control feedback of the correction drive portion 4.

Also, some recent cameras have the program AE mode in exposure modes in which either the normal program AE mode, which is a combination of shutter speed with aperture suitable for normal use, or the high speed program AE mode, which is a combination of high shutter speed with bright aperture suitable for sports pictures, can be set. In such a camera, when the program AE mode is selected and if the high speed program AE mode is set, the flow is set to proceed to S195 as shown in FIG. 4 and as described above, so that "M=M1" is set, which meets the intention of a photographer.

Further, as described at S194 in FIG. 5, the judgement of the finer photographic modes in the strobe mode being on was conducted between the leading curtain synchro flashing mode and the trailing curtain synchro flashing mode, but the selection of modes is not limited to that.

For example, the judgment of photographic mode may be based on whether the slow synchro mode (or a mode called the balance synchro mode nearly equal thereto), which can faithfully depict an atmosphere during photography, or the normal synchro mode, which employs the normal strobe synchronization shutter time, is selected, as described above. In case that S194 is replaced with the above judgement, the flow should be made to go to S197 if the slow synchro mode (or the balance synchro mode) is selected, whereas to S196 if otherwise.

Further, the value for "M" is not limited to "M1"–"M3" either, but different values may be substituted for "M" in the manual photographic mode, the shutter priority AE mode, the program AE mode (in which the normal program AE mode and the high speed program AE mode may be separated), the aperture priority AE mode, and the leading curtain synchro flashing mode and the trailing curtain synchro flashing mode in case of the strobe mode being on. In this arrangement the values substituted for "M" should be preferably determined considering the photographic frequency of panning in the respective photographic modes. It is of course possible that the camera of the present invention is provided with setting means through which a photographer can arbitrarily set the selection order of the values and the selection order is stored in the ROM portion (which preferably would be EEPROM) in the CPU unit 1.

As described with FIG. 1, the construction of the optical system for image shake correction is not limited to the present embodiment. Such an arrangement may be employed that the optical system comprises a plurality of lenses and that one or some of the lenses are shift-driven to effect the image shake correction in the same manner as described above. Also, the optical system may be a variable apical angle prism. In that case, the calculation of image shake correction amount as described at S260 in FIG. 4 should be modified. Such a modified image shake correction optical system may of course be driven in speed control using the angular velocity "Δω" of a camera shake component.

According to the present invention as described, an optimum drive property of image shake correcting means is automatically set taking the photographic purpose of a photographer into consideration in accordance with setting of one of photographic modes of camera without suspending the drive of the image shake correction means, so that the excellent image shake correction effect may be attained in each of the various photographic modes without requiring a troublesome operation, whereby an excellent photographic result may be achieved along according to the intention of the photographer without increasing a load on the photographer.

Especially, the effect is great in prevention of unnecessary removal of a smooth camera rotational operation effect in panning photography or in prevention of unnecessary image shakes in the strobe photographic mode, specifically in the slow synchro photography frequently used for photography under dark conditions.

Figure 7:
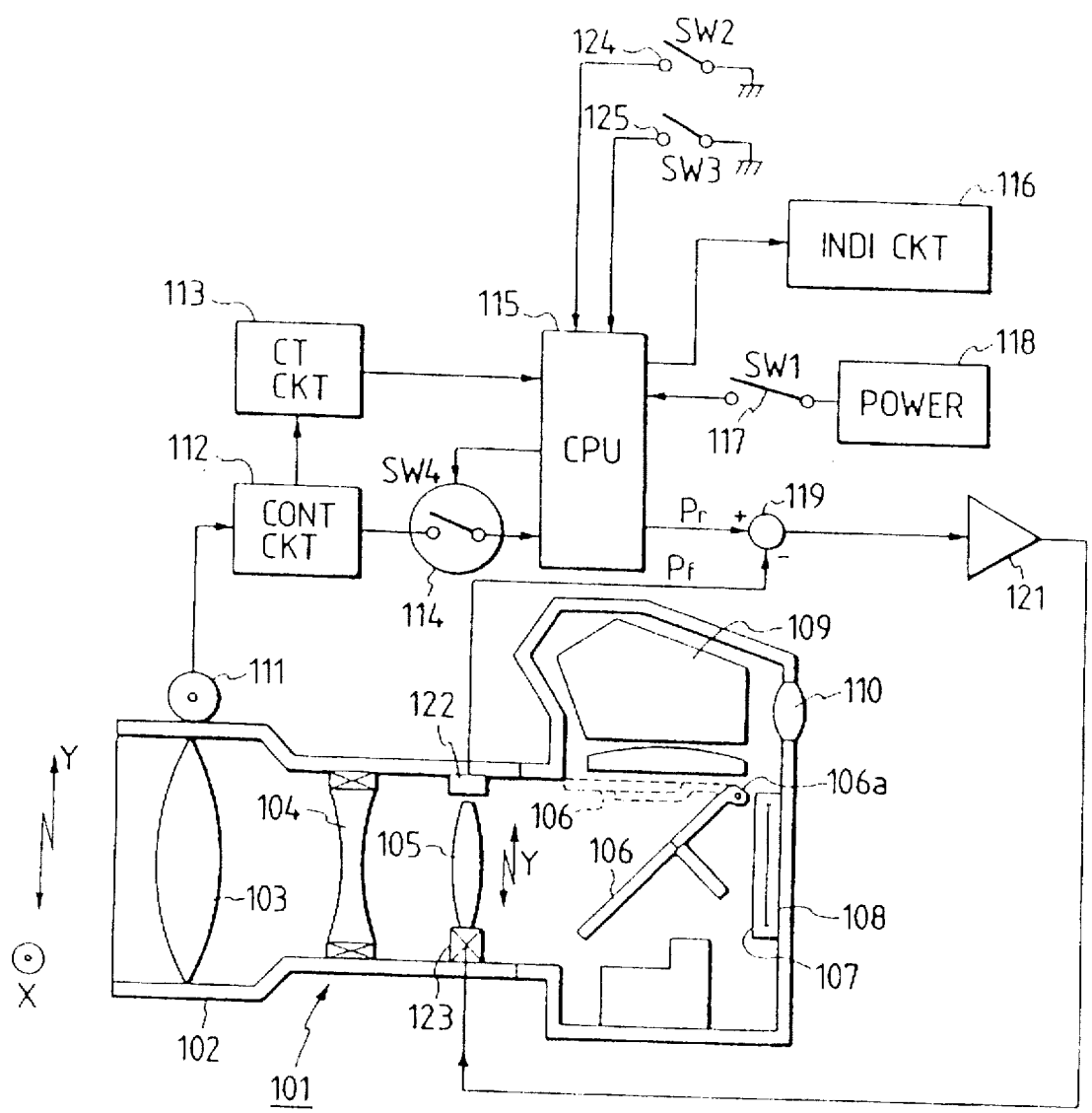
FIG. 7 is a block diagram to show the structure of a camera having an image shake preventing instrument in another embodiment of a condition output apparatus of the present invention.

FIG. 7 is a block diagram to show the structure of an image shake preventing camera as An example of the condition output apparatus of the present invention, and this embodiment is an example in which the condition output apparatus of the present invention is used in the image shake preventing camera.

In FIG. 7, during use of a viewfinder 110, rays from a photographic object (subject) pass through a convex lens group 103, a concave lens group 104, and a shake correction lens 105 in a lens barrel 102 of camera body 101, are reflected by a reflection mirror 106 and a prism 109, and are observed through the viewfinder 110. Upon photography, the reflection mirror 106 rotates about a support 106a up to the position shown by a broken line. and the rays from the photographic object form an image plane 108 on a film. Numeral 107 denotes a shutter. A half-press switch (SW 2) 124 is a switch which is switched on when an unrepresented release button is half-pressed, and a full-press switch (SW 3) 125 is one switched on when the release button is fully pressed.

The shake correction lens 105 is driven by an actuator 123 to correct camera shakes. A camera shake sensor 111 using an angular velocity sensor is fixed on the lens barrel 102, and an angular velocity signal output from the sensor is transmitted to a control circuit portion 112. The control circuit portion 112 has a low-pass filter circuit, a high-pass filter circuit, and an integration circuit, and a counting circuit 113 (counting means) counts a time between switching-on and stabilization of circuits such as the filter circuits in the control circuit portion 112. A switch (SW 4) 114 is turned on when it receives a signal from a CPU 115, and supplies a signal of camera shakes from the control circuit portion 112 to the CPU 115. Also, an indication circuit 116 (notifying means) is connected to the CPU 115, and a power source 118 is connected thereto through a main switch (SW 1) 117 (switching means).

An inverse adverse junction 119 for feedback is a junction where a command signal (Pr) from the CPU 115 for correcting camera shakes is inverted and added to a feedback signal (Pf) from a position sensor 122 for detecting a position of the shake correction lens 5. An error signal from the addition junction 119 is amplified by an amp (amplifier) 121 to become a drive signal of the actuator 123 for driving the shake correction lens 105.

Described below in detail are the construction and the operation of the embodiment of FIG. 7. The following description concerns only vertical camera shakes (in the direction shown by character Y in FIG. 7) for brevity of illustration. The same operation is carried out in case of the X-directional shakes as in case of the Y-directional shakes, and therefore the description thereof is omitted.

First described are the construction and the operation of the control circuit portion 112 and the counting circuit 113.

Figure 8:
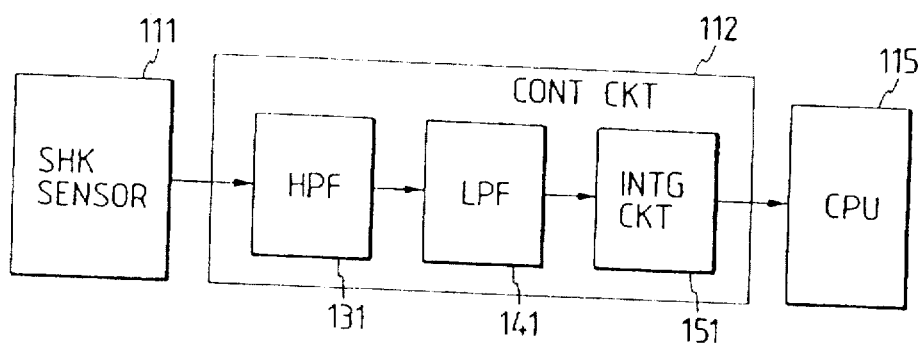
FIG. 8 is a block diagram to show the internal structure of a control circuit section 112 in FIG. 7.

(1) An angular velocity signal from the camera shake sensor 111 (angular velocity sensor) is supplied to the control circuit portion 112. FIG. 8 is a block diagram to show the internal structure of the control circuit portion 112, in which a signal from the camera shake sensor 111 is transferred to a high-pass filter circuit (HPF) 131 where drift components of the sensor are removed and a signal from HPF 131 is transferred to a low-pass filter circuit (LPF)141. The low-pass filter (LPF) 141 removes high frequency noise components. An output signal of the low-pass filter circuit (LPF) 141 is supplied to an integration circuit 151 where it is integrated and therefore converted into a displacement amount of camera shake and the integrated signal is transferred through the switch (SW 4) 114 to the CPU 115.

Figure 9:
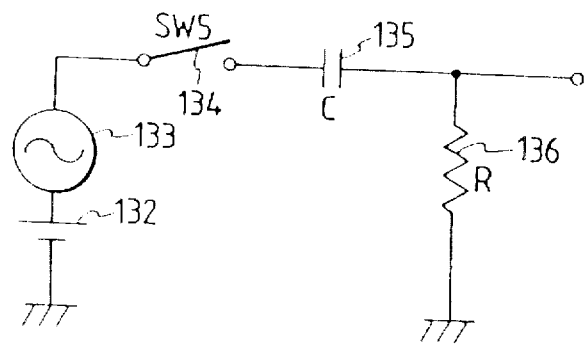
FIG. 9 is a drawing to show an example of circuit structure of a high-pass filter circuit 131 in FIG. 8.
Figure 10:
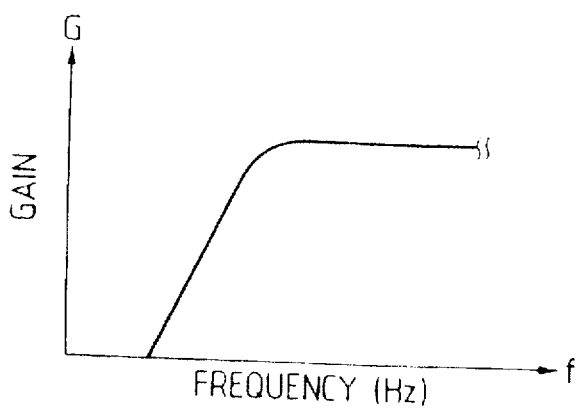
FIG. 10 is a drawing to show a frequency property of the high-pass filter circuit 131 in FIG. 9.

(2) FIG. 9 is a drawing to show an example of circuit construction of the high-pass filter circuit (HPF) 131, and FIG. 10 is a drawing to show a frequency property of the high-pass filter circuit (HPF) 131. In the high-pass filter circuit (HPF) 131 in FIG. 9, DC components 132 (corresponding to drift components) and AC components 133 (corresponding to the camera shake signal) are transferred through a switch (SW 5) 134 to a capacitor (C) 135, through which only the AC components appear on either side of a resistor (R) 136 while the DC components 132 are cut. The drift components from the camera shake sensor 111 are thus removed.

Figure 11:
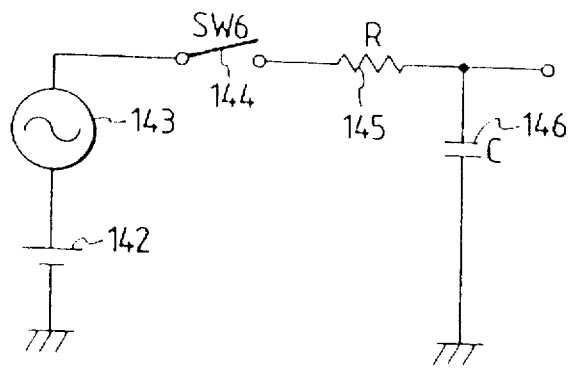
FIG. 11 is a drawing to show an example of circuit structure of a low-pass filter circuit 141 in FIG. 8.
Figure 12:
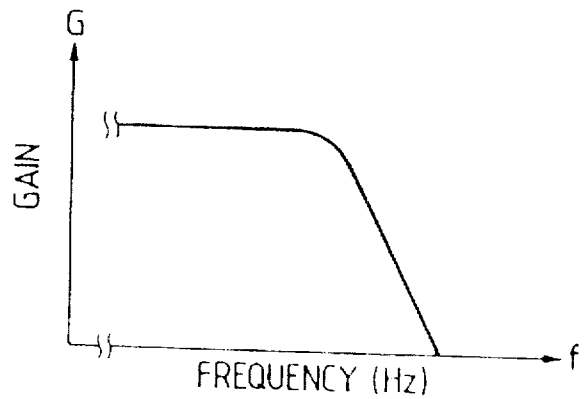
FIG. 12 is a drawing to show a frequency property of the low-pass filter circuit 141 in FIG. 11.

(3) FIG. 11 is a drawing to show an example of circuit construction of the low-pass filter circuit 141, and FIG. 12 is a drawing to show a frequency property of the low-pass filter circuit 141. In the low-pass filter circuit 141 in FIG. 11, DC components 142 and AC components 143 (corresponding to the camera shake signal and high frequency noises) are transferred through a switch (SW 6) 144 to a resistor (R) 145 to charge a capacitor (C) 146. The high frequency noise components are thus removed as shown in the frequency property in FIG. 12.

(4) The high-pass filter circuit (HPF) 131 and the low-pass filter circuit (LPF) 141 as described above must have a considerably large filter time constant $\tau$ ($\tau=C\times R$), because the frequency band of the signal (camera shake signal) from the camera shake sensor 111 is approximately 1 to 10 Hz in a low frequency zone. With such a time constant, a time of some tens of seconds is necessary for obtaining the stable frequency property as shown in FIG. 10 or in FIG. 12.

Consequently, the camera shake signal cannot be accurately detected before the circuits are stabilized, causing a blur on a photographed picture. A need thus rises to detect whether the filter circuits are stabilized and to inform a photographer of it by some means.

(5) The time counting circuit 113 is a circuit for measuring a time after the high pass filter circuit (HPF) 131 as shown in FIG. 9 or the low-pass filter circuit (LPF) 141 as shown in FIG. 11 is switched on.

(6) The counting circuit 113 measures a time after the switch (SW 5) 134 in the high pass filter circuit (HPF) 131 shown in FIG. 9 or the switch (SW 6) 144 in the low-pass filter circuit (LPF) 141 shown in FIG. 11 is turned on, and supplies a measured value to the CPU 115. The CPU 115 compares the count value from the counting circuit 113 with a maximum time constant, that is, a time constant of a filter circuit which requires the longest time before stabilized among the circuits in the control circuit portion 112. After the predetermined time has elapsed, the CPU 115 makes the switch (SW 4) 114 turned on and receives the camera shake signal from the control circuit portion 112, if it is judged that the filter circuits are fully stabilized (or when a time over the time corresponding to the time constant has elapsed).

(7) Incidentally, the main switch (SW 1) 117 is provided at a position different from the set position of the release button (not shown). When the main switch (SW 1) 117 is turned on, the power is supplied to the CPU 115 and the counting circuit 113 is started through the CPU 115. Also, the switch (SW 5) 134 (FIG. 9) in the high-pass filter circuit (HPF) 131 and the switch (SW 6) 144 (FIG. 11) in the low-pass filter circuit 141 both are simultaneously switched on. While the main switch (SW 1) 117 is in the on state, the switches (SW 5, SW 6) 134, 144 are kept in the on state.

(8) When the time to stabilize the filter circuits 131, 141 in the control circuit portion 112 has elapsed, the CPU 115 makes the indication circuit 116 continuously keep a stable indication. For example, as shown in an example of an indication method in the embodiment of the present invention in FIG. 13, a round sign "0" 162 is put on for indication below the viewfinder finder screen 161. The photographer is inhibited from starting the release before this indication is put on. Alternatively, the camera may be so arranged that the release can be started without camera shake correction in some cases. The indication circuit 116 does not always have to be provided in the vicinity of the viewfinder screen as in the present embodiment. It may be disposed, for example, on the outside of the camera body. In a further arrangement, warning sounds may be continuously given at constant intervals before a certain time elapses, whereby the photographer can be informed that the filter circuits are still unstabilized.

As described, the photographer is notified whether the filter circuits in the control circuit portion 112 are stabilized. Although the above description is focused on the example of stabilization indication of the filter circuits 131, 141, the above stabilization indication may be modified such that it is given not only when the filter circuits 131, 141 are stabilized, but also when the time constant of integration for the integration circuit 151 is determined.

Next described is an operation of the camera shake correcting circuit in the embodiment of FIG. 7.

(1) After the control circuit portion 112 is stabilized and when the switch (SW 4) 114 is turned on by a command from the CPU 115, a signal from the camera shake sensor 111 is sent through the control circuit portion 112 to the CPU 115. The CPU 115 calculates from the received camera shake signal how to move the shake correction lens 105. Based on the calculation result, the CPU 115 sends a command signal (Pr) to the addition junction 119. The signal (Pf) from the position sensor 122 of the shake correction lens 105 is also sent as a position feedback signal to the addition junction 119, where a comparison (calculation of Pr-Pf) is carried out between the signal (Pr) and the signal (Pf).

(2) The comparison result is amplified as the error signal by the amplifier 121 to become a drive signal of the actuator 123. The actuator 123 drives the shake correction lens 105 in the Y direction in this example while moving it in accordance with a position command signal from the CPU 115.

As described, when the filter circuits 131, 141 are stabilized and when the switch (SW 4) 114 is switched on, the feedback control system from the camera shake sensor 111 to the shake correction lens 105 is set to prevent the image shakes in the camera.

In the example of FIG. 7, the reflection mirror 106 is located at the position shown by a solid line, so that an image of a subject is observed through the finder 110 with image shakes of the finder image being prevented. Upon photography, the reflection mirror 106 is rotated about the support 106a up to the position shown by the broken line to withdraw from the photographic optical path, so that the image shakes of the image plane 108 may be prevented.

Figure 14:
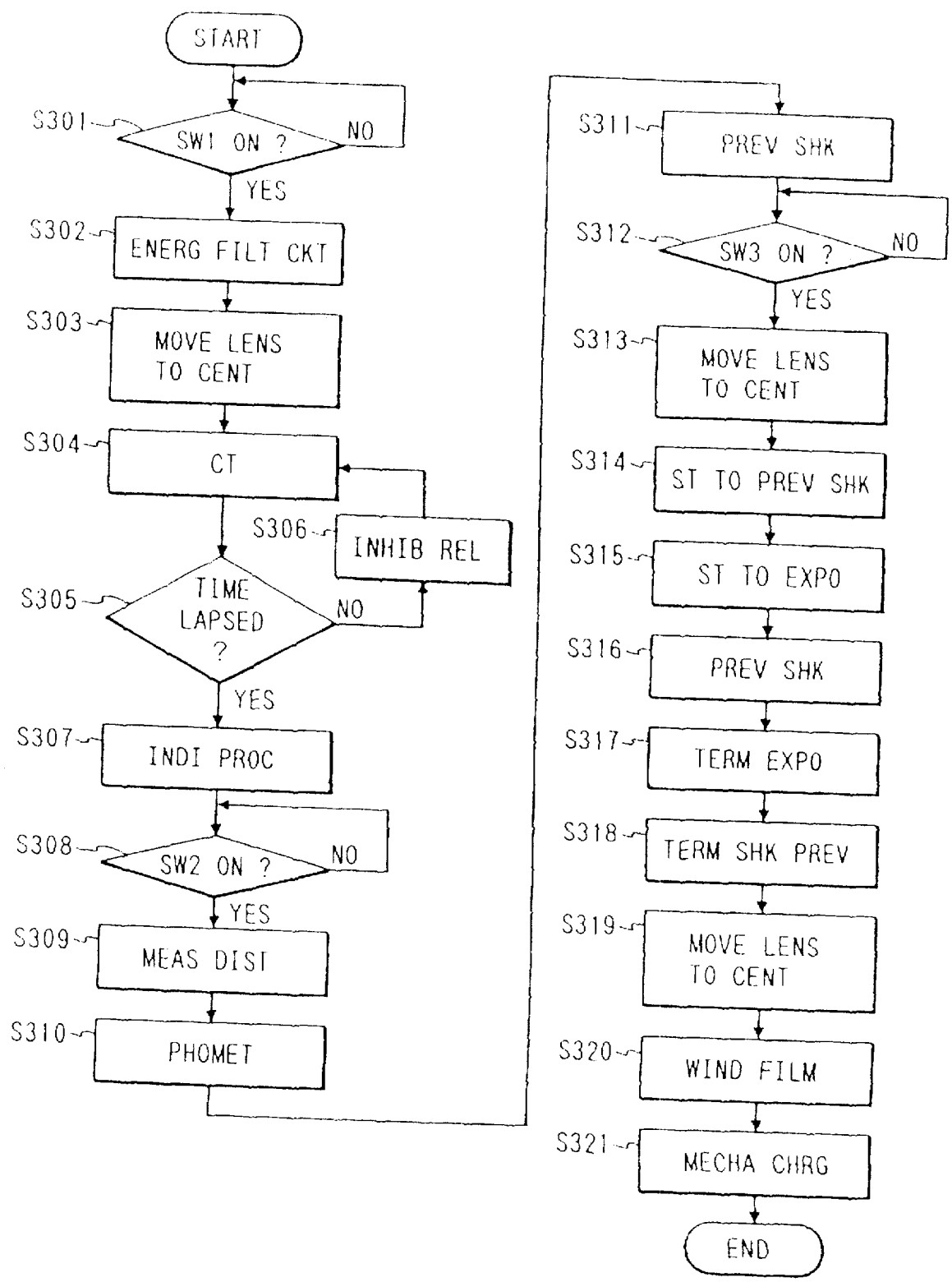
FIG. 14 is a flowchart to show a first example of operation in the embodiment of the present invention.

FIG. 14 is a flowchart to show a first example of operation in the embodiment of the present invention. In detail, this example shows an arrangement in which the release is inhibited before the filter circuits in the control circuit portion 112 are stabilized. "Release" here means that the camera starts the photographic operation.

The flowchart of FIG. 14 is described below. Symbol "S" is used for representing "a step in the flowchart."

(1) At S301 the main switch (SW 1) is turned on and thereby the power is supplied to start the operation of the CPU 115.

(2) At S302 the switch (SW 5) in the high-pass filter circuit 131 (FIG. 9) and the switch (SW 6) in the low-pass filter circuit 141 (FIG. 11) are turned on almost at the same time with the switching-on of the main switch (SW 1) to make the filter circuits effective. Also, the counting circuit 113 starts counting the time.

(3) At S303 the shake correction lens 105 moves to the center position of optical axis, which is the position of an initial state.

(4) At S304 the counting circuit 13 continues the time count (counting process) after the filter circuits are switched on at S302.

(5) At S305 the CPU 115 judges whether the time counted at S304 becomes long enough to exceed the time constants of the filter circuits so as to make the filter circuits stabilized. If they are not stabilized yet (i.e., if NO), the flow goes to S306 to inhibit the release even if the release button is pressed, and the flow goes to S304 to continue the counting process. If it is judged that the filter circuits are stabilized (or if YES), the flow goes to S307.

Figure 13:
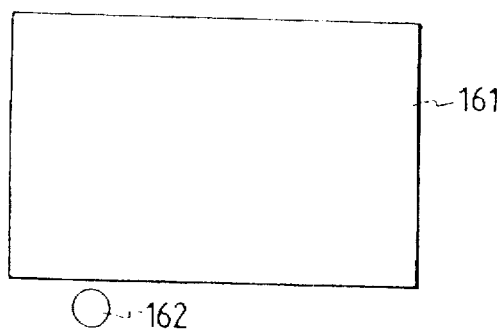
FIG. 13 is a drawing to show an example of an indication method in the embodiment of the present invention.

(6) At S307 the filter circuits are stabilized and the CPU 115 sends a signal to the indication circuit 116 to make it indicate that the filter circuits are stabilized (to put on the round sign 162 in FIG. 13 for indication).

(7) At S308, when the release button (not shown) is half-pressed the half-press switch (SW 3) is switched on, entering a preparation stage for photography (entering the preparation stage of release).

(8) A distance measurement is first carried out at S309 in the preparation stage to measure a distance to a subject.

(9) Next at S310 a photometry process (metering) is carried out to determine the aperture and the shutter speed.

(10) At S311 the shake correction lens 5 is moved to suppress image shakes, because the switch (SW 4) is on. By this, the image in the viewfinder 110 is made stabilized (unshaken).

(11) At S312 the camera stands by to await switching-on of the full-press switch (SW 3) with a full-press of the unrepresented release button.

(12) At S313, when the full-press switch (SW 3) is switched on, the mirror 106 withdraws from the position shown by the solid line in the photographic optical path to the position shown by the broken line outside the optical path (FIG. 7). During this, the shake correction lens 105 once returns to the center position on the optical axis. This is for maximizing the shake correction range in all directions.

(13) At S314 the shake correction lens 105 starts the shake prevention process.

(14) At S315 the shutter 107 is opened to start exposure on the image plane 108.

(15) At S316 the shake correction lens 105 performs the shake prevention process of image on the image plane 108 with the signal of the camera shake sensor 111, so as to stabilize the photographic image while preventing the camera shakes.

(16) At S317 the shutter 107 is closed to complete the exposure on the image plane 108.

(17) At S318 the shake prevention process is completed.

(18) At S319 the shake prevention lens 105 again returns to the lens center position on the optical axis. This is for preparing for next photography.

(19) At S320 the film at the image plane 108 is wound.

(20) At S321 the mechanical charge is carried out.

The above flow concludes a single photography of the camera in the present embodiment. If the main switch (SW 1) is kept on, the stabilization indication of the filter circuits is maintained on, and a next photography may be started from S308. This arrangement can omit the waiting time for stabilization of the filter circuits, which is thus efficient.

The flowchart as described above exemplifies the case in which the release is allowed under the judgement that the conditions of filter circuits are stabilized. The invention is not limited to this arrangement. For example, the release may be arranged to be allowed with a stabilization indication when the time constant of the integration circuit is set.

Figure 15:
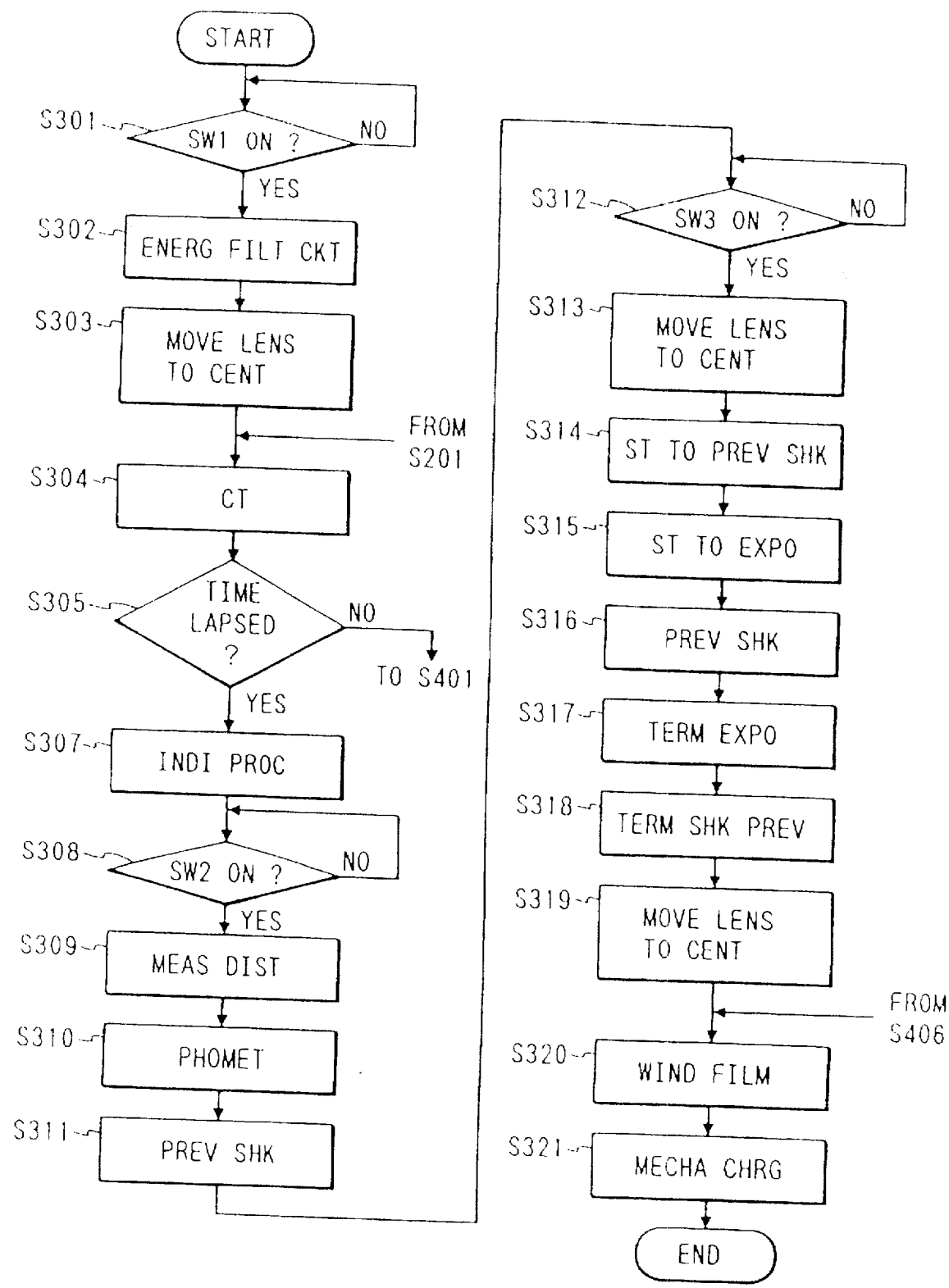
FIG. 15 is a flowchart (first half) to show a second example of operation in the embodiment of the present invention.

FIG. 15 and FIG. 16 are drawings to show a flowchart showing the second example of operation in the embodiment of the present invention. Namely, this example shows a process in a case that the release button is pressed before the filter circuits in the control circuit portion 112 are stabilized, in which the release is allowed without shake prevention process of an image so as to perform exposure. This is for losing no photo opportunity.

The flowchart in FIG. 15 and FIG. 16 will be described. Steps corresponding to those in the first operation example of FIG. 14 are given the same step numbers as in FIG. 14, and the description thereof will be omitted as possible.

(1) At S305 in FIG. 15 the affirmative branch is the same as in the first operation example and therefore not explained. In the negative branch (in case that the filter circuits are not stabilized yet) the flow goes to S401 in FIG. 16.

(2) At S401 in FIG. 16, when the release button is half-pressed (or when the half-press switch SW 2 is turned on) though the filter circuits are not stabilized yet, the preparation stage for photography is started. In this case, the indication circuit 116 does not indicate the stable state. In the case that SW 2 is not turned on, the flow returns to S304 in FIG. 15 to continue the counting of time.

(3) At S402 in FIG. 16 a distance measurement is carried out.

(4) At S403 a metering is performed to determine the aperture and the shutter speed.

(5) At S404 the camera stands by to wait switching-on of the full-press switch (SW 3) with a full press of the unrepresented release button. When the switch (SW 3) is turned on, the mirror 106 is withdrawn from the position shown by the solid line in the photographic optical path to the position shown by the broken line outside the optical path (FIG. 7).

(6) At S405 the shutter 107 is opened to start exposure on the image plane 108. In this case, the shake prevention process of the image plane 108 is not carried out at this moment, because the conditions of filter circuits are not stabilized. Also, the shake correction lens 105 is fixed with the center at the optical axis at this moment, so that the normal photography is performed.

(7) At S406 the shutter 107 is closed to complete the exposure on the image plane 108.

(8) After the that, the state of camera returns to S320 in FIG. 15, and the steps at S320 and S321 are executed to conclude a single photography.

As detailed above, the following advantages may be attained by using the condition output apparatus of the present invention in the image shake preventing camera.

(1) The stabilization indication is kept on after the conditions of the filter circuits 131, 141 or the like in the control circuit portion 112 are stabilized, whereby the photographer can discriminate the state of the camera at a glance and therefore can readily judge whether the camera is in a photography possible state.

(2) It is continuously indicated that the conditions of the circuits having time constants are stabilized, so that the photographer can always know the state of camera.

(3) Since the main switch (SW 1) is provided, the next photographic operation may be started without awaiting stabilization of the filter circuits 131 or the like if the switch (SW 1) is kept turned on.

According to the condition output apparatus of the present invention, the counting means starts counting the time after the switch is turned on, the comparing means compares the count time with a certain time corresponding to the time constant of circuits (for example a time of integral times of time constant), and the notifying means shows the stabilization indication, whereby the condition stabilization of circuits may be surely discriminated.

According to the condition output apparatus of the present invention, the stabilization of circuit conditions is continuously indicated, so that a photographer may always recognize that the circuit conditions are stabilized.

According to the condition output apparatus of the present invention, it can be judged that all the filter circuits, and the integration circuit in some cases, are stabilized, so that all circuits having the time constant may be surely stabilized.

According to the condition output apparatus of the present invention, it is notified by visual indication that the circuit conditions are stabilized, so that the stabilization of circuits may be readily recognized.

According to the condition output apparatus of the present invention, it is notified by sounds that the circuit conditions are stabilized, so that the stabilization of circuit conditions may be readily recognized.

According to the condition output apparatus of the present invention, the release operation of a camera is allowed after the circuits are stabilized, so that an operation error of a photographer may be prevented.

According to the condition output apparatus of the present invention, the normal photography is possible even if the circuit conditions are not stabilized, so that there is no photo opportunity lost in photography.

According to the condition output apparatus of the present invention, the count value by the counting means is compared with the constant time corresponding to the maximum time constant out of those of circuits, so that the circuits having respective time constants may also be surely and correctly operated.

What is claimed is:

1. An apparatus for calculating a camera shake amount, comprising:

detecting means for detecting camera shakes;

storing means for storing a predetermined storage value;

comparing means for comparing said storage value with an output of said detecting means;

calculating means for calculating a calculation value concerning the camera shakes from the output of said detecting means; and changing means for changing an input value for said calculating means into said calculation value when the output of said detecting means exceeds said storage value.

2. An apparatus according to claim 1, wherein said calculation value is an average value of camera shakes.

* * * * *

UNITED STATES PATENT AND TRADEMARK OFFICE
CERTIFICATE OF CORRECTION

PATENT NO. : 5,752,091
DATED : May 12, 1998
INVENTOR(S) : Tadao Kai, et al.

It is certified that error appears in the above-identified patent and that said Letters Patent is hereby corrected as shown below:

Title page,   [54] after "HAVING", change "ANIMAGE" to --AN IMAGE--.

Column 1,   line 1, Title, after "HAVING", change "ANIMAGE" to --AN IMAGE--;
line 5, delete "now allowed,".

Signed and Sealed this

Twenty-fifth Day of August, 1998

Attest:

BRUCE LEHMAN

Attesting Officer    Commissioner of Patents and Trademarks